(12) United States Patent
Bertsch et al.

(10) Patent No.: US 6,543,409 B2
(45) Date of Patent: Apr. 8, 2003

(54) METHOD FOR THE FORMATION OF A COMBUSTIBLE FUEL/AIR MIXTURE

(75) Inventors: Dietmar Bertsch, Aspach (DE); Martin Bezner, Walheim (DE); Uwe Schaupp, Wernau (DE); Helmut Schorn, Neuhausen a.d.F. (DE); Jörg Sievert, Waiblingen (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/810,602

(22) Filed: Mar. 16, 2001

(65) Prior Publication Data
US 2002/0002963 A1 Jan. 10, 2002

(30) Foreign Application Priority Data
Mar. 16, 2000 (DE) .......................................... 100 12 970

(51) Int. Cl.⁷ .................................................. F02B 3/00
(52) U.S. Cl. ........................ 123/299; 123/305; 123/295
(58) Field of Search ................................ 123/305, 299, 123/295, 300, 301, 400

(56) References Cited

U.S. PATENT DOCUMENTS 6,196,183 B1 * 3/2001 Bauer et al. ................. 123/295

FOREIGN PATENT DOCUMENTS

| DE | 44 41 092 | 5/1996 |
| DE | 196 42 653 | 1/1998 |
| DE | 198 15 266 | 10/1998 |

\* cited by examiner

Primary Examiner—Willis R. Wolfe
Assistant Examiner—Johnny H. Hoang
(74) Attorney, Agent, or Firm—Kenyon & Kenyon

(57) ABSTRACT

A method for the formation of a combustible fuel/air mixture in a combustion chamber of a direct-injection internal combustion engine with an injection nozzle, which has a closure body includes the steps of injecting at least two partial quantities of fuel into the combustion chamber and moving the closure body of the injection nozzle into its closed position after the injection of each of the partial quantities of fuel.

17 Claims, 2 Drawing Sheets

METHOD FOR THE FORMATION OF A COMBUSTIBLE FUEL/AIR MIXTURE

FIELD OF THE INVENTION

The present invention relates to a method for the formation of a combustible fuel/air mixture in the combustion chamber of a direct-injection internal combustion engine with an injection nozzle, which has a closure body and via which the fuel is introduced in at least two partial quantities into the combustion chamber.

BACKGROUND INFORMATION

A method for the formation of a combustible fuel/air mixture is described, for example, in German Published Patent Application No. 196 42 653. According to this method, a combustible fuel/air mixture can be formed in the cylinders of direct-injection internal combustion engines by a process in which, after the exposure of a nozzle opening by raising a valve member from a valve seat that includes the nozzle opening, fuel is injected by an injector into each combustion chamber delimited by a piston. In order to allow internal mixture formation that is optimized for consumption and emissions at every operating point of the entire engine map under all operating conditions of the internal combustion engine, especially in stratified-charge mode, provision is made for the opening stroke of the valve member and the injection time to be variable. In this case, the geometry of the jet may be altered by coking of the injection valve, and increased emissions of soot due to poor mixture formation in stratified lean-mixture operation and a reduction in the reliability of ignition due to the changing quality of the mixture at the spark plug and due to coking in stratified lean-mixture operation are possible. In addition, there are increased proportions of unburnt fuel due to dilution of zones of the mixture in stratified lean-mixture operation. In addition, there is wetting of the spark plug and hence failure thereof due to soot deposition, increased emissions of pollutants owing to incomplete combustion of the mixture at the spark plug due to random scatter of the injection jet and collapse of the injection jet under the back pressure in the combustion chamber in stratified lean-mixture operation, i.e., an increased likelihood of misfires.

It is therefore an object of the present invention to provide a method that ensures reliability of ignition and avoids coking of the spark plug at all operating points.

SUMMARY

The above and other beneficial objects of the present invention are achieved by providing a method in which the closure body of the injection nozzle can be moved into its closed position after the injection of each partial quantity. This ensures that the fuel input or the two fuel pulses are injected in a defined manner at the respective instant and thus make a significant contribution to optimum mixture formation. Closing the nozzle opening without reducing the fuel pressure applied significantly improves the respective fuel pulse.

It may be advantageous for this purpose that the first partial quantity is greater than the second partial quantity, 70% to 99% or 80% to 99% of the total quantity of fuel being introduced first, and the remainder being introduced after 0.05 ms to 0.4 ms or 1° of crank angle to 5° of crank angle and the injection cycle being ended between 50° of crank angle and 5° of crank angle before TDC (Top Dead Center). The main quantity of fuel initially introduced is prepared in an optimum manner by the extended mixture formation time before ignition and by the second pulse including the remaining quantity of fuel, and an undiluted combustible fuel/air mixture is formed.

According to one example embodiment of the present invention, the fuel may be introduced as a fuel cone and may produce a toroidal vortex at the end of the cone envelope in the region of a piston. Thus, an undiluted combustible fuel/air mixture that ensures initiation of ignition may be formed in the region of the spark plug. Inside and outside the fuel cone, the toroidal vortex carries the fuel introduced into the other regions of the combustion chamber and particularly into the region of the spark plug.

The nozzle opening of the injection nozzle may be disposed at a distance (A) of 1 mm to 8 mm from a combustion-chamber roof and at a distance (B) of 10 mm to 15 mm from a spark plug, the injection pressure of the injection nozzle varying between 100 bar and 300 bar or between 150 bar and 250 bar. The fuel jet emerging from the injection nozzle may be formed approximately conically and may include a constant jet angle $\alpha$ that is independent of the position or location of the closure element. The form of fuel jet required for optimum mixture formation, i.e., a toroidal vortex, is thereby achieved. The position of the spark plug and the position of the fuel jet may define the formation of the optimum mixture.

According to an example embodiment of the present invention, the jet angle $\alpha$ may be 10% to 50% or 20% to 40% smaller than the angle $\beta$ of the combustion-chamber roof. It is thus possible to prevent wetting of the combustion-chamber roof and to prevent the toroidal vortex from striking the combustion-chamber roof.

The fuel jet may include at least one or one inner and one outer toroidal vortex at the end of its cone envelope in the region of the piston. Optimum mixture formation is thus achieved throughout the combustion chamber.

According to the present invention, the closure element may be mounted in a coaxially rotatable manner and may be moved axially by between 0 $\mu$m and 80 $\mu$m or 10 $\mu$m and 50 $\mu$m into the combustion chamber at any time via the piezoelectric element. The rotatable closure body thus contributes a circumferential velocity component to the fuel jet or fuel cone, thus improving mixture formation and fuel input.

The closure body may include a conical sealing surface with an angle $\delta$ of between 70° and 90° or between 70° and 85°, and a housing of the injection nozzle may include a curved, parabolic or conical outlet cross section, thus forming the sealing seat or the sealing surface of the injection nozzle. Thus, the gap or nozzle opening tapers continuously towards the outlet with a curved or parabolic outlet cross section, and the fuel jet is thus accelerated continuously up to its emergence. In this arrangement, the fuel jet has a jet angle $\alpha$ that is independent of the position of the closure element.

DETAILED DESCRIPTION

Figure 1:
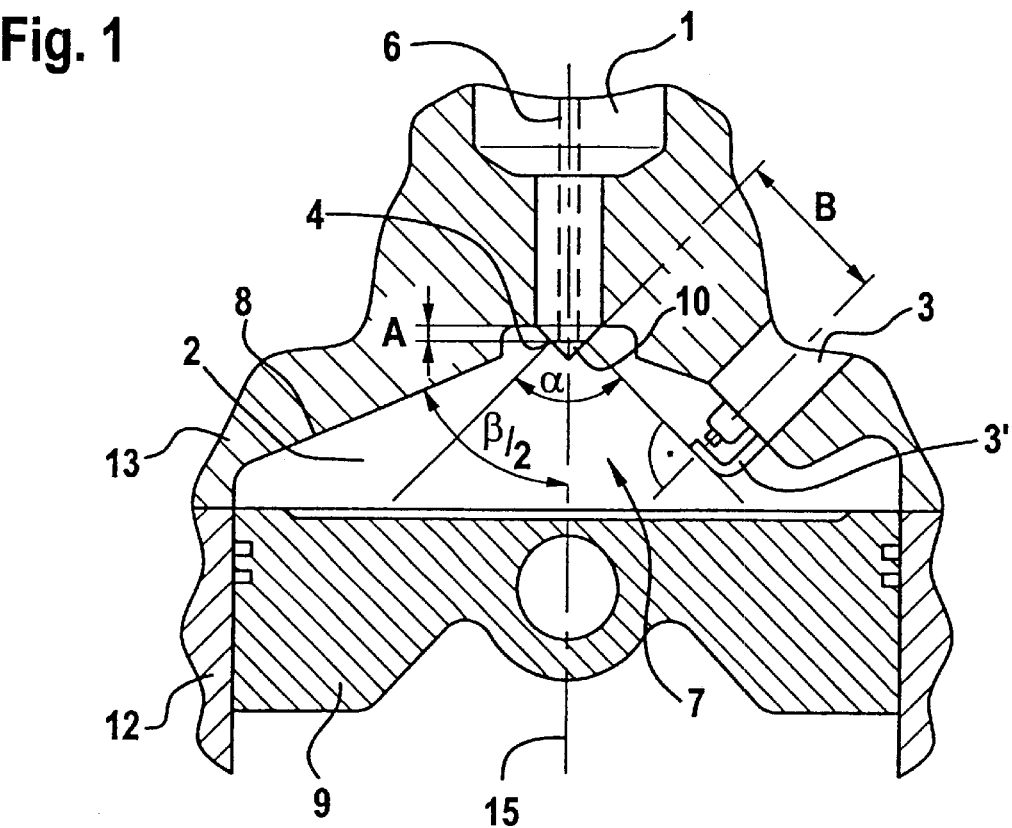
FIG. 1 is a cross-sectional schematic view of a cylinder with a piston, an injection nozzle and a spark plug.
Figure 2:
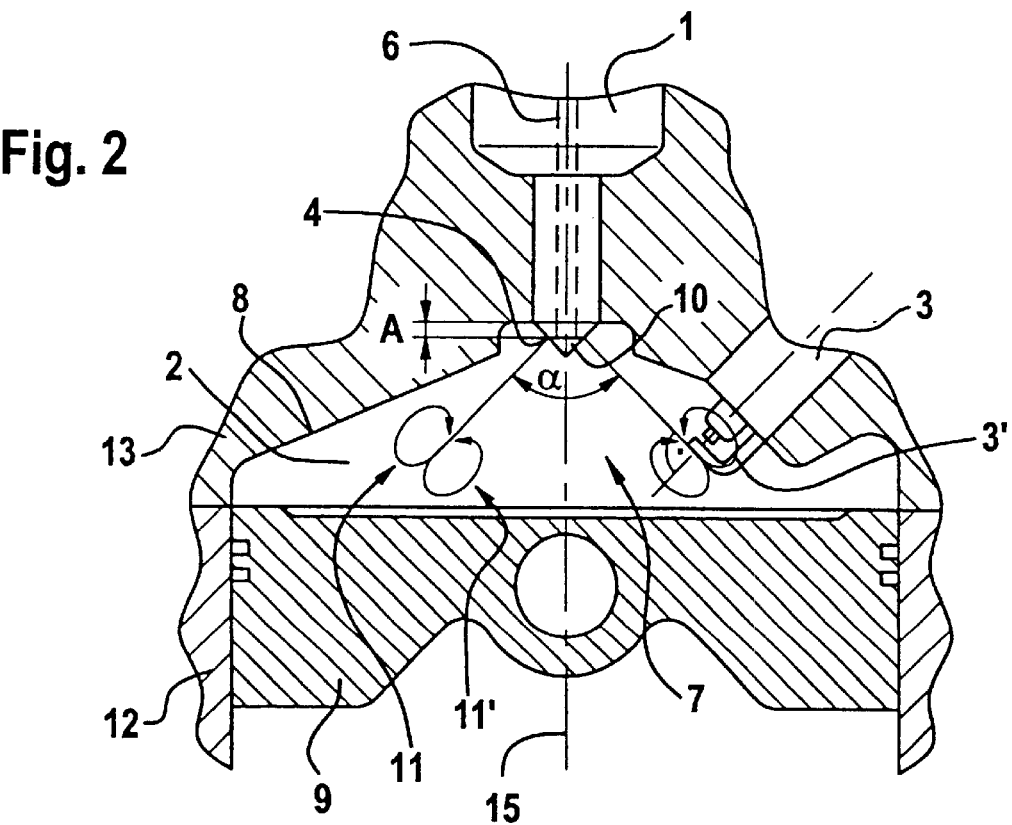
FIG. 2 is a cross-sectional schematic view of a cylinder with a piston, an injection nozzle, a spark plug and a toroidal vortex.

FIGS. 1 and 2 each illustrate a cylinder 12 of a direct-injection internal combustion engine, in which a piston 9 delimits a combustion chamber 2 together with a cylinder head 13 that closes off the cylinder 12. A fuel injection nozzle 1 is arranged coaxially at a distance of, for example, 0 mm to 10 mm from a cylinder axis 15 in the cylinder head 13. In this area, the cylinder head 13 or a combustion-chamber roof 8 has a conical or a roof-shaped design, the injection nozzle 1 being arranged at the highest point, i.e., in the region of the actual tip of the cone or roof.

A control unit (not shown) determines the instant of exposure of a nozzle opening 4 of the injection nozzle 1 specifically for each operating point of the internal combustion engine, the instant being associated with the position of a crankshaft or of the respective piston 9. Through this opening, the fuel enters the combustion chamber 2 as a fuel cone 7 in various phases of an injection cycle.

In the combustion chamber 2, a combustible fuel/air mixture is formed with the fuel injected and the charge air fed into the cylinder 12 through the inlet duct (not shown).

In stratified-charge mode, fuel injection occurs during the compression stroke. Starting with the fuel cone 7 injected, the injection process results in the formation of a cloud of mixture in the combustion chamber 2. In this process, the fuel cone 7 forms an angle α of between, for example, 70° and 90°, this angle always being somewhat smaller than the angle β of the combustion-chamber roof 8. A spark plug 3 is positioned in the combustion chamber 2 so that its center line is approximately perpendicular to the fuel cone envelope 7, i.e., the deviation is from, for example, 0° to 30°, an earth electrode 3' of the spark plug 3 being essentially unwetted by the fuel cone envelope 7. At an injection pressure of between, for example, 100 bar and 300 bar, so-called toroidal vortices 11, 11' may be formed in the region of the piston 9, starting from the generatrix of the fuel jet (see FIG. 2). The toroidal vortex 11 may be formed by the fuel cone 7 rolling up from the generatrix of the fuel cone 7 before the fuel cone 7 strikes the piston 9. A toroidal vortex 11 is formed on the outer side of the cone, extending beyond the circumference of the cone towards the combustion-chamber roof 8. With the toroidal vortex 11 formed or in the region of the toroidal vortex 11, the fuel is mixed with the air in the combustion chamber. Since the outer toroidal vortex 11 forms above the fuel cone 7, a combustible undiluted fuel/air mixture forms in the region of the spark plug 3 and at its electrode 3'. A second toroidal vortex 11' is formed within the fuel cone 7. Thus, a combustible undiluted fuel/air mixture is produced in the region of the injection nozzle 1.

Figure 3:
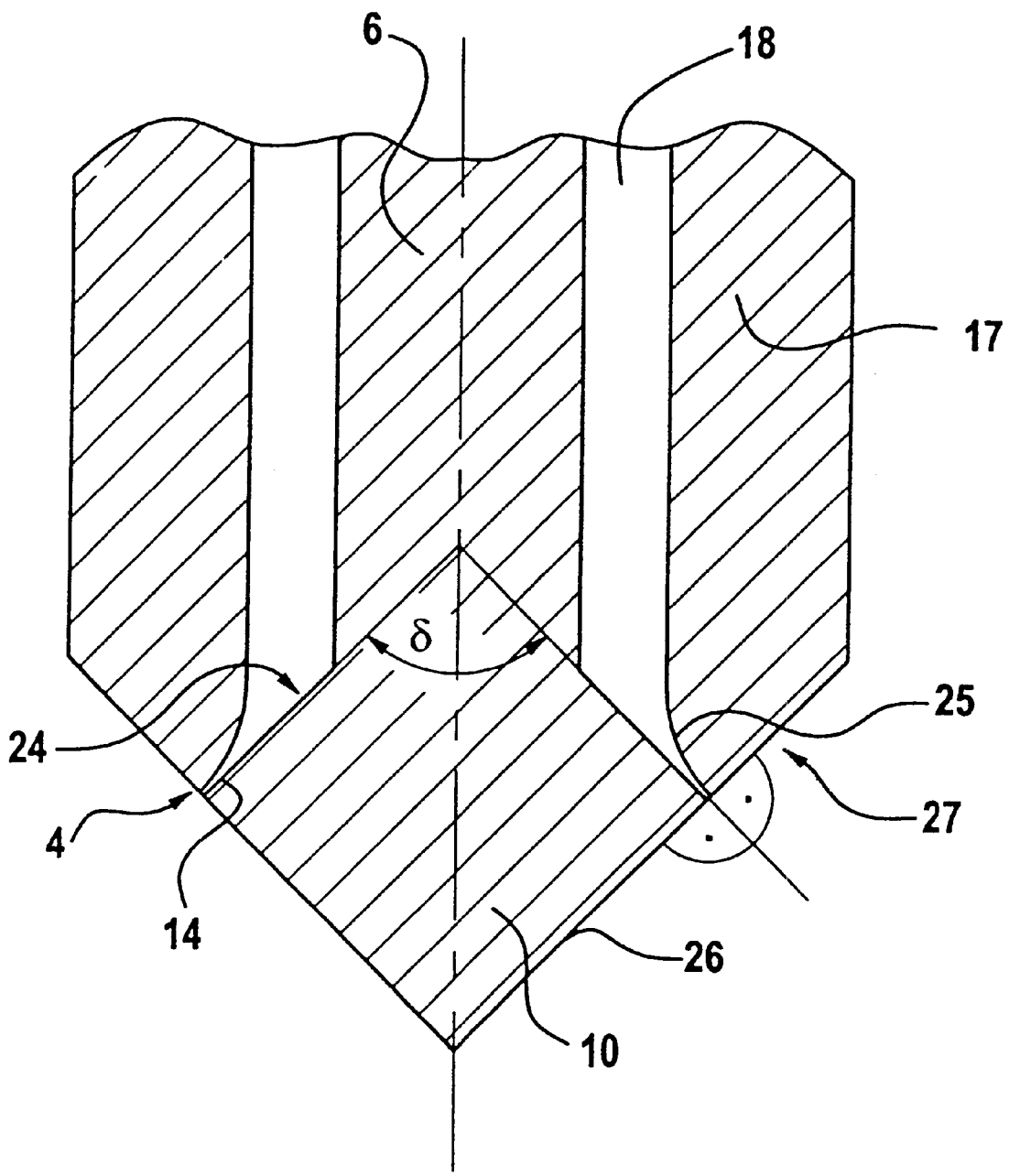
FIG. 3 is a cross-sectional schematic view of the injection nozzle of the injection valve.

FIG. 3 illustrates the injection nozzle 1 having a closure element 6 and a closure body 10. The injection nozzle 1 further includes a cylindrical housing 17, formed around a is longitudinal axis, and a fuel chamber 18 disposed between the housing wall 17 and the closure element 6.

At its upper end, the closure element 6 is coupled mechanically to an actuator (not shown) and to a return spring. The actuator may be, for example, a piezoelectric element that expands when supplied with an electric voltage and hence provides the stroke of the closure element 6. The pressure prevailing in the fuel chamber 18 exerts a restoring force in addition to that of the spring force on an upper end face (not shown) of the closure element 6. This arrangement ensures the leak-tightness of the injection nozzle 1 at all times.

The injection nozzle 1 includes the nozzle opening 4 and the closure body 10. The nozzle opening 4 is formed, at least in part, by a curved part 25 on the lower end of the housing wall 17. The curved part 25 of the housing wall 17 has a curved or parabolic cross section on the inside, i.e., at the end of the fuel chamber 18.

The closure body 10 is designed as a double cone, i.e., the closure body 10 includes one cone 26 or conical outer surface facing downwardly toward the combustion chamber and one cone or conical outer surface facing inwardly toward the fuel chamber. This inner part forms a conical sealing surface 24 and, with the inner curved or parabolic or conical part 25 of the housing 17, forms the sealing seat 14 or nozzle opening 4. In this arrangement, the generatrix of the cone 24 forms a tangent to the inner, curved part 25 of the nozzle opening 4. Both sealing surfaces 24, 25 may extend in parallel toward an outer side or end 27 of the injection nozzle 1 and may form a right angle with respect to the outer generatrix 25 of the closure body 10. The end 27 of the housing wall 17 in this region is formed in a corresponding manner as a frustoconical surface and, when the injection nozzle 1 is closed, forms a smooth transition or common conical surface with the generatrix 26. In the closed state, the cone envelope 26 is thus extended by the lower part of the housing 17 or end 27. The cross section of the fuel chamber 18 thus tapers continuously towards the sealing seat 14 and, at that point, is substantially zero in the closed state.

When the closure element 6 is displaced axially, the sealing surface 24 of the closure body 10 rises from the parabolic part 25 of the housing 17 into the combustion chamber 2 and thus opens the nozzle opening 4 for the fuel. The opening stroke of the closure element 6 and the duration of opening of the nozzle opening 4 determine the fuel flow rate through the nozzle opening 4 and hence the overall quantity or partial quantity of fuel supplied.

What is claimed is:

1. A method for forming a combustible fuel/air mixture in a combustible chamber of a direct-injection internal combustion engine having an injection nozzle, the injection nozzle including a closure body, comprising the steps of:
   injecting in a single combustion cycle at least two partial quantities of fuel into the combustion chamber via the injection nozzle; and
   moving the closure body of the injection nozzle into a closed position after injecting each of the partial quantities of fuel.

2. The method according to claim 1, wherein a first one of the partial quantities of fuel is greater than a second one of the partial quantities of fuel.

3. A method for forming a combustible fuel/air mixture in a combustible chamber of a direct-injection internal combustion engine having an injection nozzle, the injection nozzle including a closure body, comprising the steps of:
   injecting at least two partial quantities of fuel into the combustion chamber via the injection nozzle; and
   moving the closure body of the injection nozzle into a closed position after the injection of each partial quantity of fuel, wherein a first partial quantity of fuel includes 70% to 99% of a total quantity of fuel, a second partial quantity of fuel being injected after the injection of the first partial quantity of fuel after one of 0.05 ms to 0.4 ms and 1° to 5° of crank angle, an injection cycle being completed between 50° and 5° of crank angle before a top dead center position.

4. The method according to claim 3, wherein the first partial quantity of fuel includes 80% to 99% of the total quantity of fuel.

5. The method according to claim 1, wherein the injection nozzle is configured to inject the partial quantities of fuel as a fuel cone having at least one toroidal vortex produced at an end of a cone envelope in a region of a piston of the internal combustion engine.

6. The method according to claim 1, further comprising the step of forming an undiluted combustible fuel/air mixture in a region of a spark plug of the internal combustion engine, the undiluted fuel/air mixture ensuring initiation of ignition.

7. A cylinder head for an internal combustion engine having a combustion chamber, comprising:
   a spark plug provided in the combustion chamber;
   an injection nozzle having a closure element; and
   an actuator configured to move the closure element;
   the cylinder head being configured to perform a method for forming a combustible fuel/air mixture in the combustion chamber, the method including the steps of:
      injecting in a single combustion cycle at least two partial quantities of fuel into the combustion chamber via the injection nozzle; and
      moving the closure element of the injection nozzle into a closed position after injecting each of the partial quantities of fuel;
   wherein a nozzle opening of the injection nozzle is disposed at a distance of 1 mm to 8 mm from a roof of the combustion chamber and at a distance of 10 mm to 15 mm from the spark plug, and wherein an injection pressure of the injection nozzle varies between one of 100 bar to 300 bar and 150 bar to 250 bar.

8. The cylinder head according to claim 7, wherein the injection nozzle is configured to inject a fuel jet that is substantially conical having a constant jet angle, the constant jet angle being independent of at least one of a position and a location of the closure element.

9. The cylinder head according to claim 7, wherein the jet angle is one of 10% to 50% and 20% to 40% smaller than an angle of the roof of the combustion chamber.

10. The cylinder head according to claim 7, wherein the injection nozzle is configured to inject a fuel jet having at least one toroidal vortex at an end of a cone envelope in a region of a piston of the internal combustion engine.

11. The cylinder head according to claim 10, wherein the fuel jet injected by the injection nozzle has one internal toroidal vortex and one external toroidal vortex.

12. The cylinder head according to claim 7, wherein the closure element is mounted coaxially rotatably and is axiably movable by one of 0 $\mu$m to 80 $\mu$m and 10 $\mu$m to 50 $\mu$m into the combustion chamber at any time by the actuator.

13. The cylinder head according to claim 7, wherein the closure element includes a conical sealing surface having an angle of one of between 70° to 90° and between 70° to 85°;
   wherein a housing of the injection nozzle includes one of a curved, a parabolic and a conical outlet cross-section; and
   wherein the sealing surface and the outlet cross-section form at least one of a sealing seat and a sealing surface of the injection nozzle.

14. The cylinder head according to claim 7, wherein a first one of the partial quantities of fuel is greater than a second one of the partial quantities of fuel.

15. The cylinder head according to claim 7, wherein a first partial quantity of fuel includes 70% to 99% of a total quantity of fuel, a second partial quantity of fuel being injected after the injection of the first partial quantity of fuel after one of 0.05 ms to 0.4 ms and 1° to 5° of crank angle, an injection cycle being completed between (N 50° and 5° of crank angle before a top dead center position.

16. The cylinder head according to claim 15, wherein the first partial quantity of fuel includes 80% to 99% of the total quantity of fuel.

17. The cylinder head according to claim 7, wherein the method further includes the step of forming an undiluted combustible fuel/air mixture in a region of the spark plug, the undiluted fuel/air mixture ensuring initiation of combustion.

* * * * *